(12) United States Patent
Fisher et al.

(10) Patent No.: US 6,712,638 B2
(45) Date of Patent: Mar. 30, 2004

(54) COMMUNICATION DEVICE FOR A HANDHELD COMPUTER

(75) Inventors: Scott Fisher, San Francisco, CA (US); Cheri Nola Leonard, San Jose, CA (US)

(73) Assignee: palmOne, Inc., Milpitas, CA (US)

( * ) Notice: Subject to any disclaimer, the term of this patent is extended or adjusted under 35 U.S.C. 154(b) by 0 days.

(21) Appl. No.: 10/083,925

(22) Filed: Feb. 26, 2002

(65) Prior Publication Data

US 2003/0162433 A1 Aug. 28, 2003

(51) Int. Cl.[7] .............................. H01R 13/64; G06F 1/16
(52) U.S. Cl. ........................ 439/374; 439/310; 439/350; 361/686
(58) Field of Search ................................. 439/350, 374, 439/353, 929, 310, 533, 347, 136; 361/686, 727, 683, 726, 801

(56) References Cited

U.S. PATENT DOCUMENTS

| | | | | |
|---|---|---|---|---|
| 5,052,943 A | * | 10/1991 | Davis ......................... | 439/357 |
| 5,627,727 A | * | 5/1997 | Aguilera et al. ............. | 439/374 |
| 5,829,997 A | * | 11/1998 | Okano et al. ................ | 439/210 |
| 5,964,601 A | * | 10/1999 | Tsurumaru et al. ......... | 439/341 |
| 5,996,956 A | * | 12/1999 | Shawver ...................... | 361/686 |
| 6,113,409 A | * | 9/2000 | Park ............................ | 439/929 |
| 6,193,546 B1 | * | 2/2001 | Sadler ......................... | 439/929 |
| 6,490,155 B2 | * | 12/2002 | Han et al. .................... | 361/686 |

* cited by examiner

*Primary Examiner*—P. Austin Bradley
*Assistant Examiner*—Briggitte Hammond
(74) *Attorney, Agent, or Firm*—Shemwell, Gregory & Courtney; Van Mahamedi

(57) ABSTRACT

A communication device is provided for use with a handheld computer. The communication device includes an electrical connector and a coupling mechanism. The coupling mechanism is configured to direct a housing portion of the handheld computer towards the electrical connector so as to create an active contact between the electrical connector and a connector of the handheld computer. Alternatively, the coupling mechanism is configured to resist separation of the handheld computer from the communication device so as to maintain an electrical contact between connectors of the handheld computer and the communication device.

46 Claims, 8 Drawing Sheets

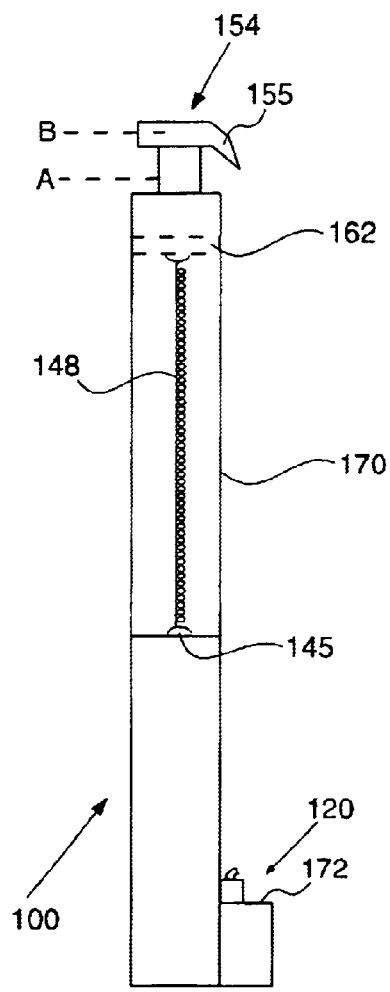
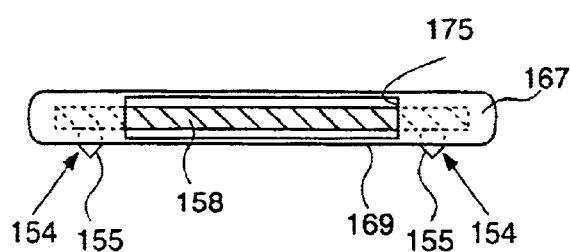
FIG. 2
FIG. 3

COMMUNICATION DEVICE FOR A HANDHELD COMPUTER

FIELD OF THE INVENTION

The present invention relates to handheld computers. In particular, the present invention relates to a communication device for a handheld computer.

BACKGROUND OF THE INVENTION

Handheld computers are devices that can be used for recording, storing, creating, and updating information, including personal management information such as used for running address book, memo pad and calendar applications. In general, handheld computers share information with other computers. In particular, handheld computers share information with larger computers, such as desktop computers. In a typical application, a user may synchronize a handheld computer with a personal computer in order to backup recorded information on the handheld computer, to transfer updated or newly recorded information from the handheld computer to the personal computer, or to transfer newly recorded or updated information from the personal computer to the handheld computer.

One mechanism by which handheld computers share information with other computers is through use of a wired data port connection. Such connections offer users the ability to constantly maintain their handheld computers in communications with their desktop or personal computers. One type of communication device typically used with handheld computers is a cradle. The cradle supports a handheld computer in an upright position, while extending a wired connection between the handheld computer and a personal computer. The cradle allows for the handheld computer to be synchronized continuously, or at the user's initiative, while maintaining a display of the handheld computer in a viewable position.

Handheld computers are typically dropped into cradles. Alignment structures may be used to facilitate a connector on the handheld computer making connection with another connector on the cradle. Typically the connection between the handheld computer and the cradle is passive. On occasions, the handheld computer may miss its connection with the cradle. As a result, a formed connection between the handheld computer and the cradle may be easily dislodged when the handheld computer misses the connection with the electrical connector.

Some past solutions for forming an active connection between the handheld computer and the cradle include forming a spring bias at the connection point between the handheld computer and the cradle. Specifically, the bottom of the handheld computer may be biased into the cradle to maintain a more secure connection. Such designs often require the user to withdraw the handheld computer using a specific type of motion. Where the user has to pull the handheld computer forward, before pushing it upward and off the cradle.

In general, communication devices such as cradles support the handheld computer in an upright position. Typically, a cradle uses a passive, gravitational force to maintain a connector of the handheld computer in communication with a connector of the cradle. In order to sustain the handheld computer in communication with the connector of the cradle, the cradles tilt the handheld computer at an angle that ranges between 30–60 degrees from a vertical axis corresponding to the gravitational direction. This angle is intended to use gravity to prevent the handheld computer from falling forward when resting on the cradle.

SUMMARY OF THE INVENTION

A communication device is provided for use with a handheld computer. The communication device includes an electrical connector and a coupling mechanism. The coupling mechanism is configured to direct a housing portion of the handheld computer towards the electrical connector so as to create an active contact between the electrical connector and a connector of the handheld computer.

Alternatively, the coupling mechanism is configured to resist an upward motion of the handheld computer that would cause separation of the handheld computer from the communication device. In this manner, the handheld computer is able to maintain an electrical contact between connectors of the handheld computer and the communication device.

BRIEF DESCRIPTION OF THE DRAWINGS

Embodiments of the invention are illustrated by way of example, and not by way of limitation, in the figures of the accompanying drawings. Like reference numerals are intended to refer to similar elements among different figures.

FIG. 2 is a side-view of the communication device of FIG. 1, under an embodiment of the invention.

FIG. 3 is a top view of a communication device, under an embodiment of the invention.

DETAILED DESCRIPTION OF THE INVENTION

Figure 1:
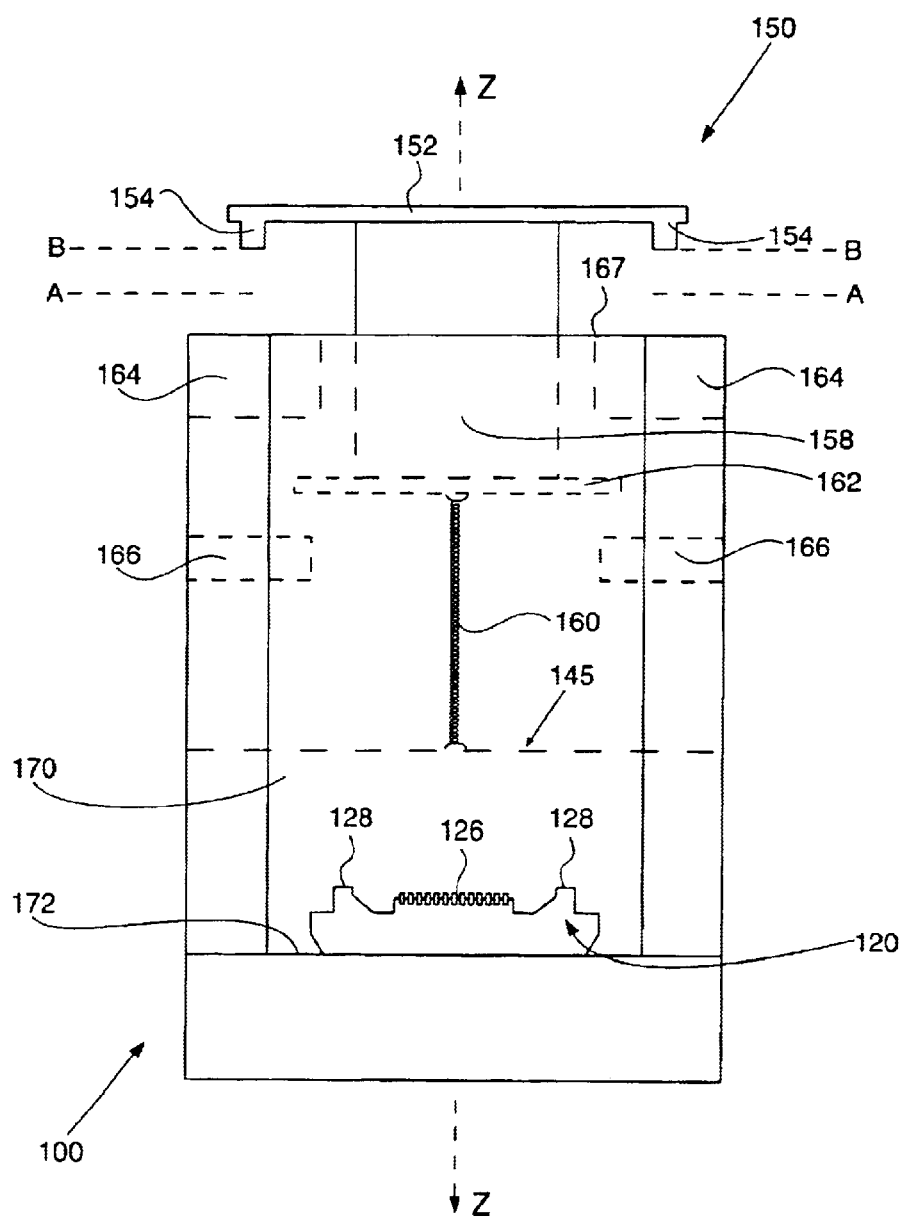
FIG. 1 is a frontal view of a communication device including a coupling structure for coupling to a handheld computer, under an embodiment of the invention.

Embodiments of the invention describe a communication device for a handheld computer. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

A. Overview

Embodiments of the invention provide for a communication device for a handheld computer. The communication device includes an electrical connector and a coupling mechanism. The coupling mechanism is configured to direct a housing portion of the handheld computer towards the electrical connector so as to create an active contact between the electrical connector and a connector of the handheld computer.

As used herein, a handheld computer is any computer device that is dimensioned to be carried with one hand. Typical examples of handheld computers include, for example, devices that execute a PALM OS, manufactured by PALM INC. Other examples include devices that operate a POCKET PC operating system, manufactured by MICROSOFT CORP. Still further, handheld computers may include pagers and mobile phones, including such devices which maintain user-entered personal information, such as phone numbers.

A communication device is any device that enables a handheld computer to communicate with another device.

An active contact between two connectors is a contact in which at least one of the two connectors is forced into the other connector by some force other than gravity, while the two connectors are in contact.

According to an aspect of the invention, the coupling mechanism includes a first arm that is moveable between a first position and a second position. In the second position, the first arm is insertable into an opening on the back face of a housing portion of the handheld computer, without causing the electrical connector to be in contact with the connector of the handheld computer. In the first position, the first arm is inserted into the opening of the handheld computer and the electrical connector is forced into contact with the connector of the handheld computer.

According to another embodiment of the invention, the coupling mechanism may be used on a communication device having a support structure that supports the handheld computer in an upright position while maintaining an active contact between the connectors of the handheld computer and the communication device. In one embodiment, the upright position may correspond to a position aligned substantially about an axis corresponding to the direction of gravity.

In still another embodiment of the invention, a coupling mechanism of a communication device is configured to maintain contact between the electrical connector and a connector of the handheld computer while resisting a housing portion of the handheld computer being moved away from the electrical connector. Thus, the contact between the handheld computer and the connector of the communication device may be passive, but an active force may resist or preclude movement of the handheld computer away from the electrical connector. Several mechanisms may be used to achieve this type of connection. For example, a spring may bias the handheld computer to resist movement away from the connector of the communication device. Or a locking mechanism may be used to secure the handheld computer in place, with the connector of the handheld computer in contact with the connector of the communication device.

B. Communication Device for Handheld Computer

FIG. 1 is a frontal view of a communication device including a coupling structure for coupling to a handheld computer, under an embodiment of the invention. A communication device 100 includes a connector 120 for extending communications to a handheld computer, a coupling mechanism 150 that couples a connector of the handheld computer with the connector 120, and a support wall 170 to support the handheld computer in an upright position.

The connector 120 may be a serial port, Universal Serial Bus connector, Firewire connection (manufactured by APPLE COMPUTERS INC.), or any other connector for exchanging data between a handheld computer and a desktop, laptop, server or other computer station. In one embodiment, connector 120 is a serial connector, including pins 126, and a latch member 128. The latch member 128 extends into corresponding connector openings (not shown) of the handheld computer when pins 126 make contact with corresponding pins of the handheld computer's connector.

Figure 8:
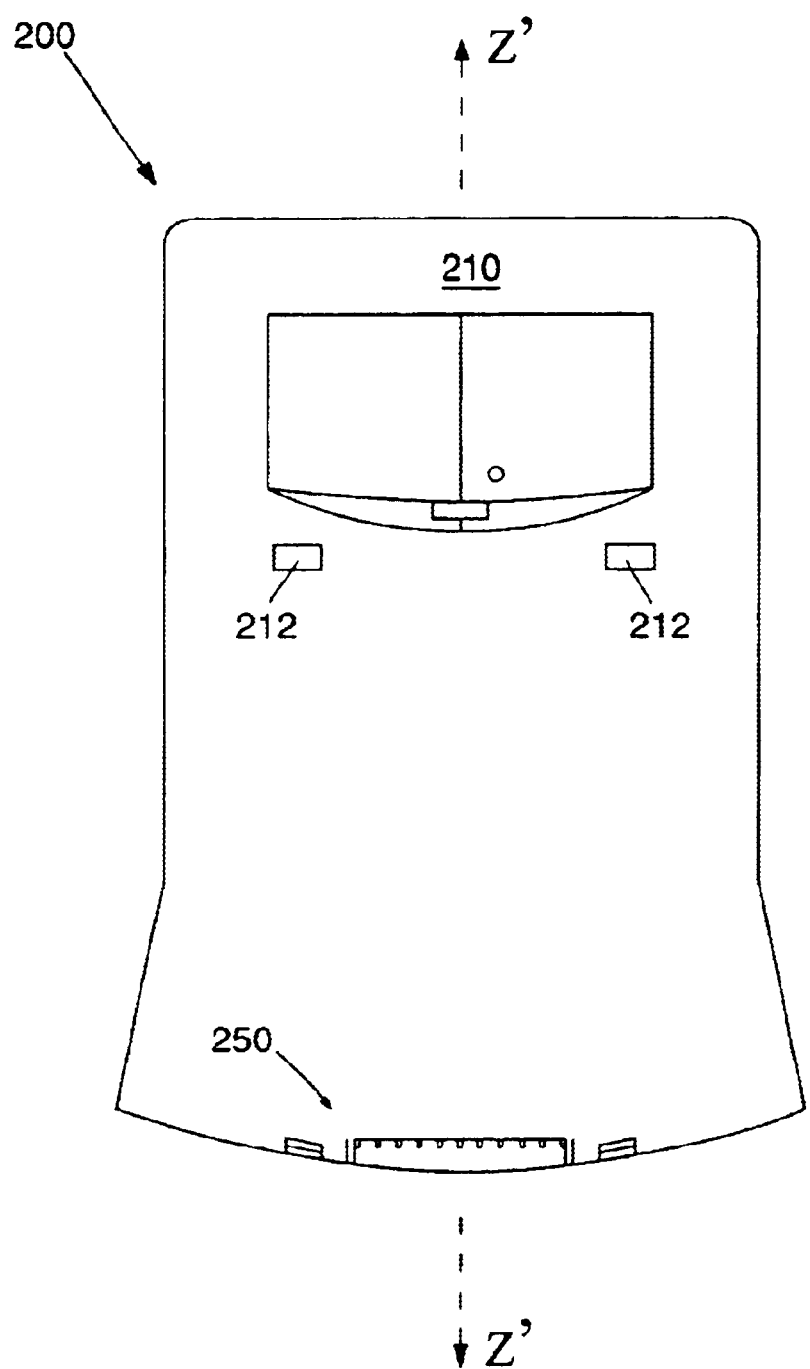
FIG. 8 is a back view of a handheld computer for use with an embodiment of the invention.
Figure 9:
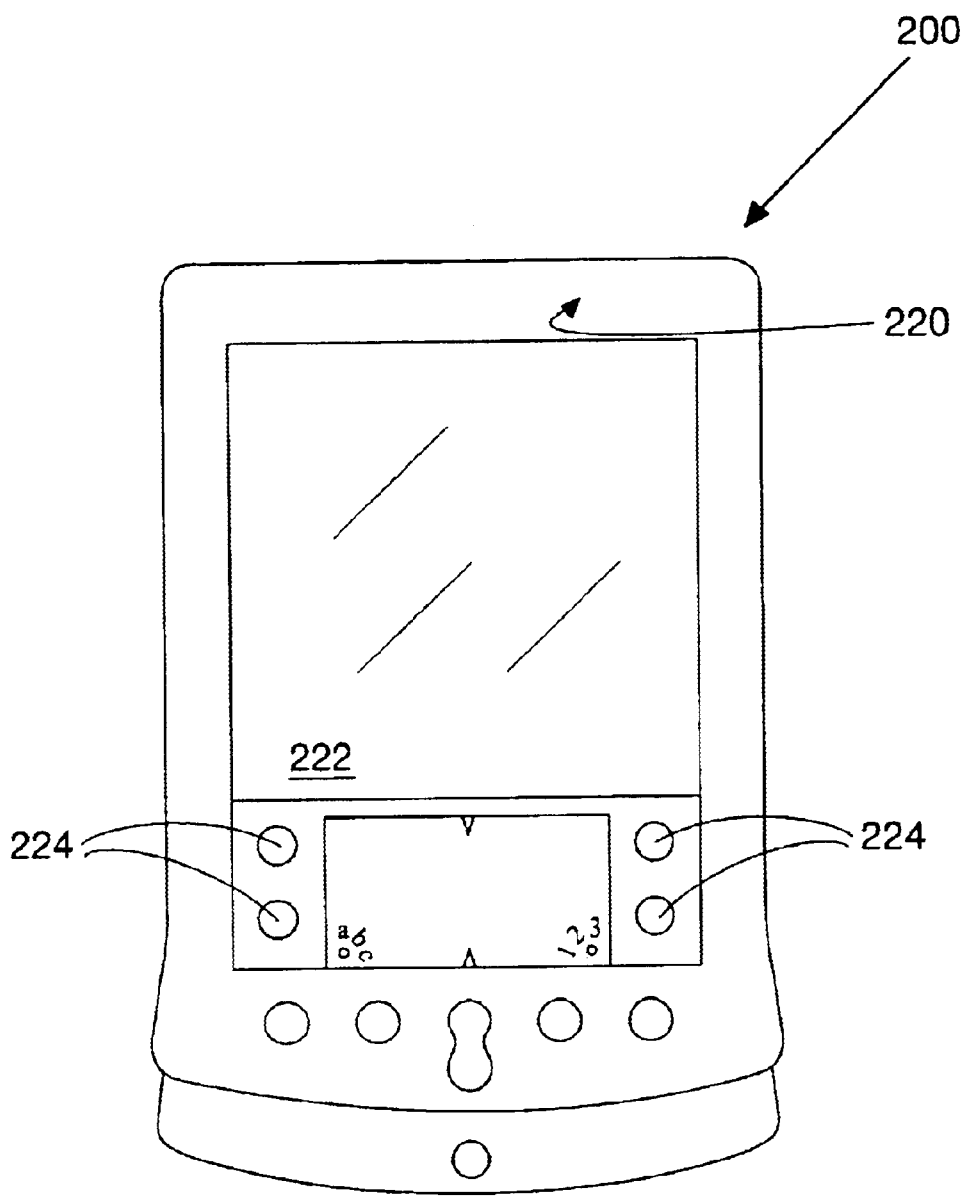
FIG. 9 is a front view of a handheld computer for use with an embodiment of the invention.

The coupling structure 150 is adapted to secure and maintain electrical contact with handheld computer 200 (see FIGS. 8 and 9). When engaged, coupling structure 150 will direct the handheld computer 200 downward so as to force the connector 250 (FIG. 8) of the handheld computer to mate with connector 120. The coupling structure 150 includes a top bar 152 that extends laterally across communication device 100. In one embodiment, the top bar 152 includes a pair of protruding arms 154. Each arm 154 may protrude downward so as to insert into apertures 212 (FIG. 8) of handheld computer 200. In one embodiment, arms 154 insert into apertures or openings on a back face 210 (FIG. 8) of the handheld computer 200. The number and dimensions of the arms 154 may be designed to accommodate any variations of apertures on different housing structures of the handheld computer 200.

In an embodiment, coupling structure 150 is moveable along a vertical axis Z. FIG. 1 illustrates the coupling structure 150 in an extended position (position B). As will be described, the extended position may correspond to the coupling structure 150 havings its greatest bias. The coupling structure 150 may be moved into the extended position by pulling top bar 152 from position A to position B. Once in the extended position, sufficient vertical clearance may exist between top bar 152 and connector 120 to accommodate portions of handheld computer 200 A portion of handheld computer 200 may be inserted between the space created by the movement of top bar 152 away from connector 120. The arms 154 may then insert into apertures 212 of handheld computer 200. When the top bar 152 is released from position B, the coupling structure 150 directs handheld computer 200 downward, along the handheld computer's lengthwise axis Z' (see FIG. 8).

The coupling structure 150 may be coupled to an interior base 145. In one embodiment, the coupling structure 150 is connected to the interior base 145 via an elongated spring 160. The spring 160 is biased to pull top bar 152 downward. The bias of the spring increases when the top bar 152 is moved from position A to position B. According to one embodiment, when top bar 152 is in position A, sufficient bias exists to maintain a downward force on handheld computer 200, so as to force the connector 250 of the handheld computer to maintain its contact with connector 120.

Other configurations are possible for biasing top bar 152 when it is moved. For example, a series of short springs may be used to bias top bar 152.

In an embodiment shown by FIG. 1, top bar 152 may extend from a member 158 that is moveably coupled with communication device 100. A part of member 158 may slide into or out of the communication device 100. The length in which member 158 may slide is the same as the distance between position A and B of top bar 152. A bottom bar 162 on member 158 may secure to spring 160 so that the top bar 152 is biased when it is moved from position A to position B. An upward stop 164 maybe used to preclude member 158 from over-traveling in the upward direction. A downward stop 166 may be used to maintain position B at a distance from a top 167 of the communication device 100. In one embodiment, spring 160 maintains a bias when top bar 152 is in position A. Therefore, downward stop 166 precludes top bar 152 from over-traveling because of the constant spring bias. In this way, downward stop 166 prevents fingers from being caught between top bar 152 and communication device 100. In addition, the downward stop 166 ensures that spring 160 is biased when top bar 152 is in position B, so as to maintain a positive contact between the connector of handheld computer 200 and connector 120.

The support wall 170 is adapted to support handheld computer 200 in an upright position when the handheld computer's connector is mated with connector 120. The support wall 170 may include a ledge 172. A bottom of handheld computer 200 may rest on the ledge 172. The connector 120 may extend from ledge 172 to mate with the connector of the handheld computer 200.

In one embodiment, the support wall 170 maintains the handheld computer 200 at an angle of between 30-60 degrees about a vertical. In another embodiment, support wall 170 maintains handheld computer 200 almost vertically. Among other advantages, coupling structure 150 enables handheld computer 200 to be support in a vertical fashion on communication device 100 without handheld computer 200 falling forward. The coupling structure 150 can maintain handheld computer 200 in position even when users tap a display 222 (FIG. 9) or press buttons 224 (FIG. 9) on the handheld computer 200 while it is being supported on communication device 100.

FIG. 2 is a side-view of the communication device of FIG. 1, under an embodiment of the invention. The side view illustrates one embodiment in which arms 154 are adapted to engage corresponding apertures on handheld computer 200. In one embodiment, each of the arms 154 include a sloped tip 155. The sloped tip 155 inserts into apertures 212 (FIG. 8) on the back face 210 (FIG. 8) of handheld computer 200 (FIG. 8). Once the arms 154 are moved from the extended position into the secured position, the slope of the tip 155 facilitates maintaining the connection between coupling structure 150 and handheld computer 200.

The spring 160 extends from bottom bar 162 to interior base 145. Movement of top bar 152 from position B to position A causes the spring 160 to stretch. As a result, the spring 160 has its greatest bias when top bar 152 is in position A.

As shown by FIG. 2, connector 120 extends from ledge 172. The support wall 170 may extend orthogonally from ledge 172. The entire communication device 100 may be tilted, or mounted in a vertical position.

FIG. 3 is a top view of communication device 100. The top surface 167 may include an opening 175 which receives member 158. The top bar extends out of the opening 158. As shown by FIG. 2B, the arms 154 of top bar 152 extend outward beyond a front surface 169 of the communication device 100. Specifically, sloped tips 155 protrude beyond front surface 169 of communication device 100.

C. Moveable Aspect of a Communication Device for Engaging a HandHeld Computer

Figure 4:
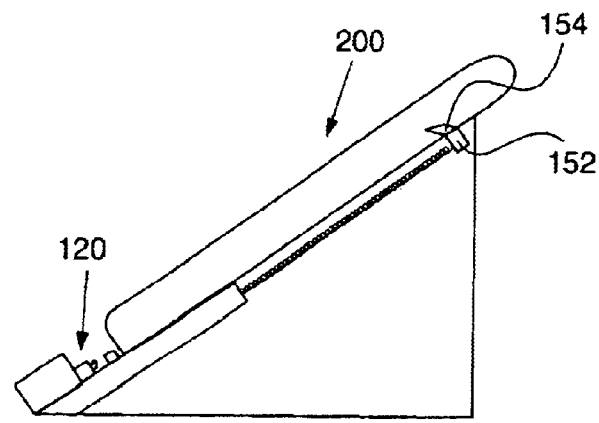
FIG. 4 illustrates a communication device in an extended position to receive a handheld computer, under an embodiment of the invention.
Figure 5:
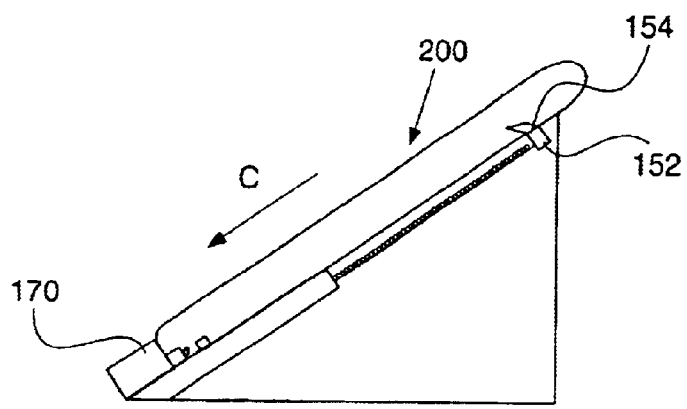
FIG. 5 illustrates a communication device in a retracted position to maintain engagement between a connector of a handheld computer and a connector of the communication device.

FIGS. 4 and 5 illustrate communication device 100 moving from a retracted position into an extended position for purpose of engaging and securing handheld computer 200 in electrical contact with the communication device.

FIG. 4 illustrates top bar 152 moved into the extended position (position B in FIG. 1) so that arms 154 insert into the apertures on the back face of handheld computer 200. The spring 160 is stretched when top bar 152 is moved into the extended position. In this position, sufficient clearance is present between the arms 154 and connector 120 to accommodate a length of handheld computer 200 (FIGS. 8 and 9) being received on support wall 170.

FIG. 5 illustrates top bar 152 released into the retracted position (position A in FIG. 1). In this position, handheld computer 200 is guided down, as shown by directional arrow C, so that the connector of the handheld computer makes contact with connector 120. When guided down, a bottom of the handheld computer 200 may rest on ledge 170.

In one embodiment, spring 160 maintains a bias when top bar 152 is in the retracted position. This bias in the retracted position enables an active contact to be maintained between the connector of handheld computer 200 and connector 120. Furthermore, top member 152 may be positioned so that sufficient clearance is not available for the removal of handheld computer 200 from communication device 100 without first moving top member 152 upward.

D. Communication Device Structures

Figure 6:
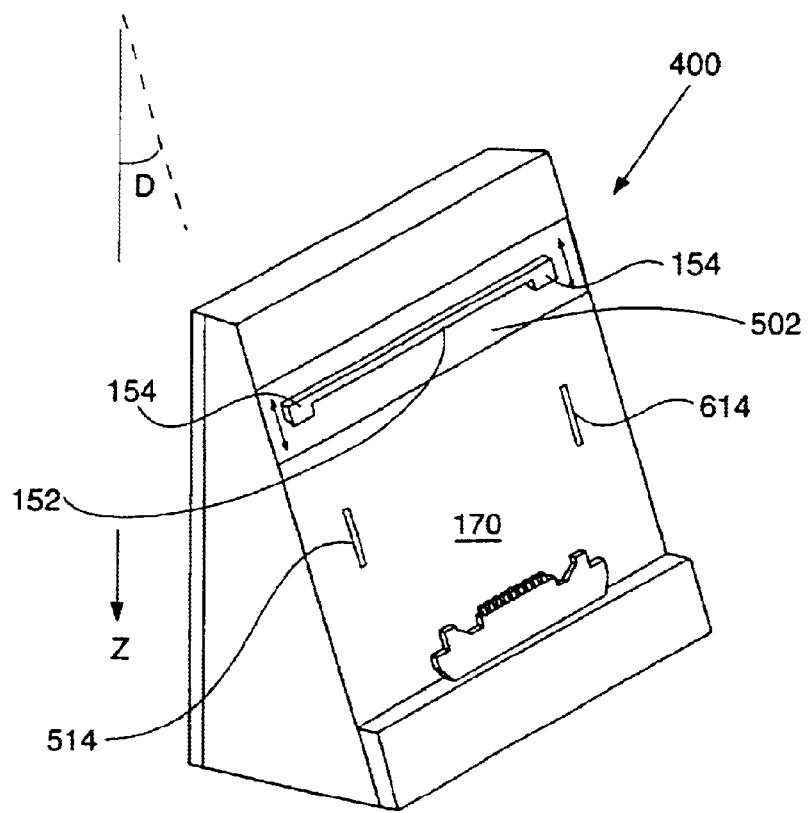
FIG. 6 illustrates a communication device structure, under an embodiment of the invention.

FIG. 6 illustrates a communication device structure 400, under one embodiment of the invention. The communication device 100 maybe integrated into the structure 400. In one embodiment, support wall 170 extends at an angle D from a vertical axis Z corresponding to the direction of gravity. An opening 502 in the support wall 170 may provide access to top bar 152. The arms 154 may protrude from support 170 in a manner described above. In an embodiment such as shown by FIG. 6, the support wall 170 maintains the handheld computer 200 in a tilted and upright position for use. A pair of guide members 514 facilitate alignment of the handheld computer 200 with the communication device structure 400.

Figure 7:
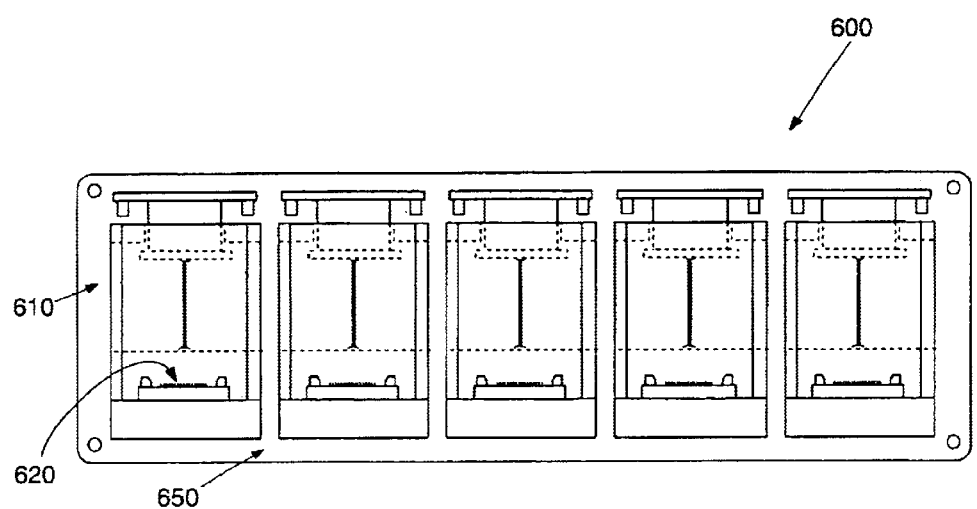
FIG. 7 illustrates a communication device structure, under another embodiment of the invention.

FIG. 7 illustrates a mounted communication device structure 600, under another embodiment of the invention. The communication device structure 600 may house several communication devices 610. Each communication device 610 maybe as described with other embodiments of the invention (see e.g. FIG. 1). The communication device structure 600 may enable several handheld computers to communicate to one computer system or network through connectors 620 on the individual communication devices 610. The communication device structure 600 may include a mounting surface 650 that enables the structure to be mounted to a wall or other vertical surface. When mounted, each communication device 610 supports a corresponding handheld computer 200 in a vertical position.

E. Handheld Computer

FIGS. 8 and 9 illustrate a handheld computer for use with an embodiment of the invention. In FIG. 8, a back face 210 of a handheld computer 200 is shown. In the example shown, the handheld computer 200 may correspond to a PALM m505 organizer, manufactured by PALM INC. The back face 210 of the handheld computer 200 includes a pair of apertures 212. A connector 250 is positioned towards a bottom of the handheld computer 200. The handheld computer is shown oriented along a vertical axis Z'.

According to one implementation, arms 154 (FIG. 1 and FIG. 2) are adapted to insert and engage openings 212 on the back face 210. A housing portion corresponding to the back face 210 is directed downward on communication device 100 so that connector 250 is maintained in contact with connector 120 of the communication device. In one embodiment, arms 154 may engage apertures 212 to force back face 210 of handheld computer 200 downward while maintaining contact between connector 250 and connector 120. In another embodiment, arms 154 engage apertures 212 to resist or preclude back face 210 of handheld computer 200 from moving upward while connector 250 is in contact with connector 120.

FIG. 9 illustrates a front face of a handheld computer for use with an embodiment of the invention. The communication device 100 such as described with FIGS. 1 and 2 may support the handheld computer 200 in an upright position, so a front face 220 of the handheld computer is viewable to a user. The front face 220 includes a display 222 and a plurality if buttons 224. While handheld computer 200 is mated to communication device 100, the user may view display 222, and input data using either the display or the buttons 224.

F. Hardware Diagram

Figure 10:
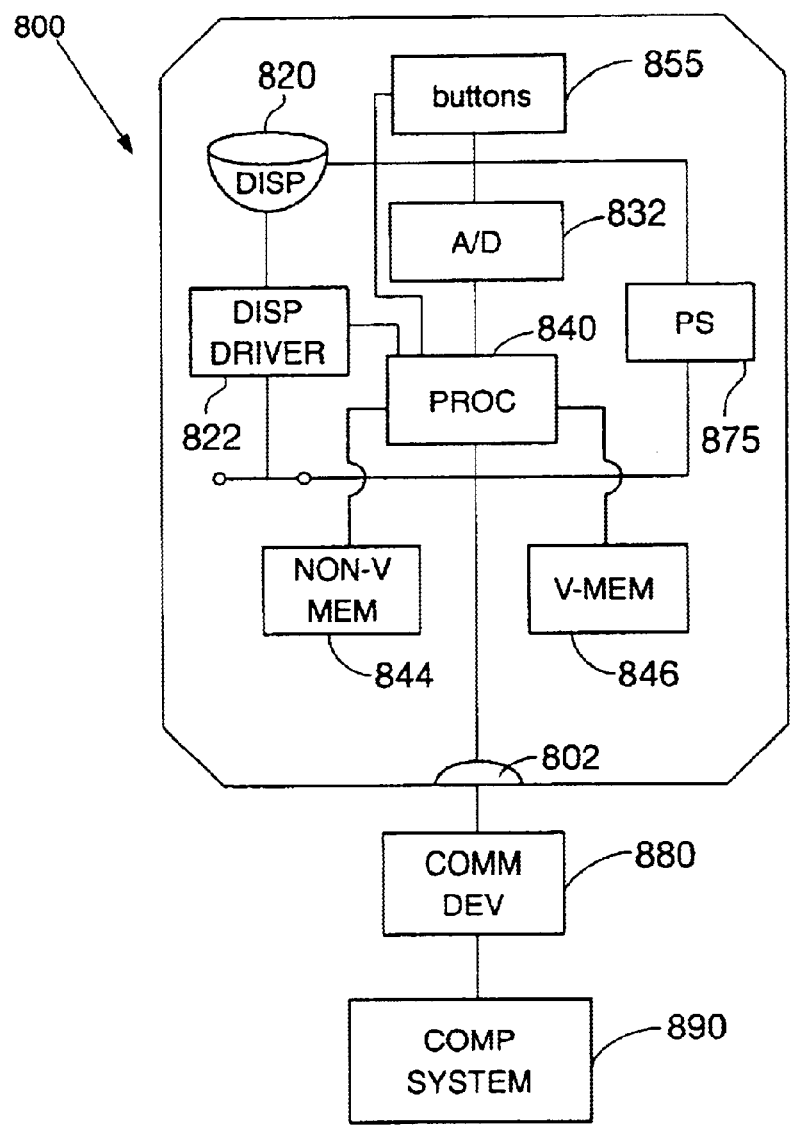
FIG. 10 is a block diagram of a handheld computer coupled to another computer via a communication device, under an embodiment of the invention.

FIG. 10 is a block diagram of a handheld computer coupled to another computer via a communication device, under an embodiment of the invention. In an embodiment, a handheld computer 800 includes a processor 840 coupled to a first memory 844 (non-volatile) and a second memory 846 (volatile). The processor 840 is coupled to a display driver 822. The processor 840 combines with display driver 822 to process and signal data for presentation on a display assembly 820. The display assembly 820 includes screen and digitizer.

An analog-digital (AD) converter 832 is coupled to processor 840. One or more channels from A/D converter 832 maybe used to convert analog input provided by the digitizer, or by another analog input mechanism.

Input mechanisms such as buttons 855 may be detectable by processor 840. A power source 875, such as Lithium-Ion batteries, may power one or more of the internal components of the handheld computer 800. The power source 875 may also power the communication device 880 and/or the computer system 890, described below. Alternatively, the power source 875 may be recharged by either one of the communication device 880 or the computer system 890.

The handheld computer 800 may include one or more expansion ports for coupling to accessory devices, such as cradles, modems, memory units, re-chargers and other devices. Examples of expansion ports include serial ports, Universal serial Bus (USB) ports, CompactFlash slots and infra-red ports. In an embodiment shown, a first expansion port 802 enables one or more types of expansion modules to be connected to processor 840. The handheld computer 800 may also include a second expansion port to couple to another accessory device.

A communication device 880 may act as an intermediary between handheld computer 800 and another computer 890. For example, the communication device 880 may be an intermediate device to a desktop computer and the handheld computer 800. Other computer devices may be connected to the handheld computer 800 via communication device 880. Such devices may include, for example, a network enabled device, a laptop computer, a memory storage device, an external battery unit, a global positioning system and a cable modem.

G. Alternative Embodiments

While certain embodiments described above provide for a spring to bias the coupling mechanism, other embodiments may use other devices. For example, resilient levers may be used to create a similar bias.

Still further, other devices may use locking mechanisms instead of a bias mechanism. For example, a locking mechanism may be configured to lock the handheld computer in place and preclude any upward movement.

While embodiments described above illustrate a coupling mechanism that engages openings on a back face of the handheld computer, other embodiments may engage openings on any housing portion or surface. Furthermore, it is possible for levers, arms or arms of the coupling mechanism to engage recesses, surface formations or other structures, rather than openings. It is possible for the levers, arms or arms to make friction contact with smooth surfaces on the housing portions of the handheld computer as well, for purpose of directing the handheld computer downward and maintaining electrical contact between the handheld computer and the communication device.

The communication device may extend communications between the handheld computer and other computers using any one of a wired or wireless connection. Examples of wireless connections include infrared, BlueTooth, or other radio-frequency communications.

H. Conclusion

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A communication device for a handheld computer, the communication device comprising:

an electrical connector;

a support structure that is oriented to support the handheld computer in at least a partially upright position; and a coupling mechanism that is moveable on the support structure along an axis Z corresponding to the at least partially upright position, wherein the coupling mechanism includes at least a first arm to engage an opening on a back face of a housing portion, the at least first arm being moveable along the axis Z in order to direct the housing portion of the handheld computer towards the electrical connector.

2. The communication device of claim 1, wherein the coupling mechanism is configured so that the first arm contacts a top edge surface of the housing portion to direct the housing portion towards the electrical connector.

3. The communication device of claim 1, wherein the first arm of the coupling mechanism is adapted to engage an opening on an exterior of the housing portion for the handheld computer to direct the housing portion towards the electrical connector.

4. The communication device of claim 1, wherein the support structure supports the handheld computer at an angle of between 0 and 45 degrees about an axis corresponding to a gravitational direction on the handheld computer.

5. The communication device of claim 1, wherein the support structure supports the handheld computer at an angle of less than 5 degrees about an axis corresponding to a gravitational direction on the handheld computer.

6. The communication device of claim 1, wherein the support structure corresponds to a wall-mount.

7. The communication device of claim 1, further comprising a line connection to extend communications from a computer to the handheld computer via the electrical connector and the connector of the handheld computer.

8. The communication device of claim 1, further comprising one or more alignment structures formed on the support structure in order to facilitate alignment of the handheld computer with the support structure when the coupling mechanism directs the housing portion of the handheld computer towards the electrical connector.

9. The communication device of claim 1, wherein the first arm is moveable between a first position and a second position, wherein in the second position, the first arm is insertable into the opening on the back face of the housing portion, and the electrical connector is not in contact with the connector of the handheld computer, and wherein when the first arm is inserted into the opening of the handhold computer and the first arm is moved into the first position, the electrical connector is forced into contact with the connector of the handheld computer.

10. The communication device of claim 9, wherein the coupling mechanism includes a spring to provide a bias of the first arm when the first arm is moved from the first position to the second position.

11. The communication device of claim 9, wherein the at least first arm includes a sloped section that enables the first arm to engage the opening of the housing portion when in the second position, and to secure into the opening of the housing portion when moved from the first position into the second position so as to stay engaged with the housing portion to enable the coupling mechanism to direct the housing portion towards the electrical connector.

12. The communication device of claim 1, wherein the coupling mechanism includes the first arm, a second arm, and a member that extends between the first arm and the second arm, and wherein the member is moveable along the axis Z with the first arm and the second arm.

13. The communication device of claim 12, wherein the support structure includes a base structure, and wherein the coupling mechanism includes an elongated spring that connects the member to the base structure of the communication device, and wherein the member is moveable between a first position and a second position, the second position corresponding to the elongated spring being stretched, and wherein in the second position, the first arm and the second arm are each insertable into the corresponding openings in the back face of the housing portion, and wherein subsequently the member is releasable from the second position to the first position so as to cause the electrical connector to be forced into contact with the connector of the handheld computer.

14. The communication device of claim 13, wherein the first arm is configured to extend into a first opening of housing portion, and the second arm is configured to extend into a second opening of the housing portion.

15. The communication device of claim 1, wherein the support structure includes a ledge to support a bottom of the handheld computer.

16. The communication device of claim 15, wherein the electrical connector extends outward from the ledge.

17. A communication device for a handheld computer, the communication device comprising:
an electrical connector; and
a coupling mechanism including at least a first arm adapted to engage an opening on a back face of the housing portion, wherein the first arm is moveable between a first position and a second position, wherein in the second position, the first arm is insertable into the opening on the back face of the housing portion, and the electrical connector is not in contact with the connector of the handheld computer, and wherein when the first arm is inserted into the opening of the handheld computer and the first arm is moved into the first position, the electrical connector is forced into contact with the connector of the handheld computer;
wherein the coupling mechanism includes a spring to provide a bias of the first arm when the first arm is moved from the first position to the second position; and
wherein the coupling mechanism is configured so that the first arm is in the first position until moved into the second position to insert the first arm into the opening of the back face of the handheld computer, and the bias of the first arm in the second position enables the first arm to release from the second position into the first position to create an active contact between the electrical connector and the connector of the handheld computer.

18. The communication device of claim 17, further comprising a support structure to support the handheld computer in at least a partially upright position when the housing portion of the handheld computer is directed towards the electrical connector.

19. The communication device of claim 17, wherein the first arm is moveable between a first position and a second position, wherein in the second position, the first arm is insertable into the opening on the back face of the housing portion, and the electrical connector is not in contact with the connector of the handheld computer, and wherein when the first arm is inserted into the opening of the handheld computer and the first arm is moved into the first position, the electrical connector is forced into contact with the connector of the handheld computer.

20. The communication device of claim 17, wherein the support structure supports the handheld computer at an angle of between 0 and 45 degrees about an axis corresponding to a gravitational direction on the handheld computer.

21. The communication device of claim 17, wherein the support structure supports the handheld computer at an angle of about 5 degrees about an axis corresponding to a gravitational direction on the handheld computer.

22. The communication device of claim 17, further comprising a line connection to extend communications from a computer to the handheld computer via the electrical connector and the connector of the handheld computer.

23. The communication device of claim 17, further comprising one or more alignment structures formed on the support structure in order to facilitate alignment of the handheld computer with the support structure when the coupling mechanism directs the housing portion of the handheld computer towards the electrical connector.

24. The communication device of claim 17, wherein the support structure includes a ledge to support a bottom of the handheld computer.

25. The communication device of claim 24, wherein the electrical connector extends outward from the ledge.

26. The communication device of claim 17, wherein the support structure corresponds to a wall-mount.

27. The communication device of claim 26, further comprising a support structure to support the handheld computer in at least a partially upright position when the housing portion of the handheld computer is directed towards the electrical connector.

28. A communication device structure for a plurality of handheld computers, the communication device structure comprising:
a plurality of communication devices, each communication device being coupleable to a corresponding handheld computer in the plurality of handheld computers;
a mounting structure to secure the plurality of communication devices to a common surface; and
wherein each communication device comprises:
an electrical connector;
a support structure that is oriented to support the corresponding handheld computer in at least a partially upright position; and
a coupling mechanism that is moveable on the support structure along an axis Z corresponding to the at least partially upright position, wherein the coupling mechanism includes at least a first arm to engage an opening on a back face of a housing portion of the corresponding handheld computer, the at least first arm being moveable in order to direct the housing portion towards the electrical connector while maintaining contact between the electrical connector and a connector of the corresponding handheld computer.

29. The communication device structure of claim 28, wherein the mounting structure is configured to secure the plurality of communication devices to a wall.

30. The communication device structure of claim 28, wherein each of the communication devices are adapted to retain the corresponding handheld computer in the plurality of handheld computers in an upright position that is less than 5 degrees about an axis corresponding to a gravitation direction on the communication device structure.

31. A communication device for a handhold computer, the communication device comprising:
   a means for establishing an electrical connection between the communication device and the handheld computer;
   a means for supporting the handheld computer in at least a partially upright position; and
   a coupling means for coupling the handheld computer to the communication device by directing a housing portion of the handheld computer towards the electrical connection means so as to create a force for maintaining the electrical connection means, wherein the coupling means is moveable on the support means along an axis Z corresponding to the at least partially upright position, and wherein the coupling means includes at least a first engagement means for engaging an opening on a back face of the housing portion of the handheld computer, wherein the engagement means is moveable along the axis Z to create the force.

32. A communication device for a handheld computer, the communication device comprising:
   an electrical connector; and
   a support structure that is oriented to support the handheld computer in at least a partially upright position;
   a coupling mechanism that is moveable on the support structure along an axis Z corresponding to the at least partially upright position, wherein the coupling mechanism includes at least a first arm that is to (i) insert into and be withdrawn from an opening on a back face of a housing portion and (ii) be positionable along the axis Z in order to permit coupling and decoupling of the handheld computer from the support structure, wherein the at least first arm can be inserted into the opening and be positioned along the axis Z so as to maintain contact between the electrical connector and a connector of the handheld computer and to resist any movement of the handheld computer that would disrupt contact between the electrical connector and the connector of the handheld computer.

33. The communication device of claim 22, further comprising a biasing mechanism to bias the coupling mechanism to resist the housing portion of the handheld computer from being moved away from the electrical connector.

34. The communication device of claim 33, wherein the biasing mechanism includes a spring.

35. The communication device of claim 22, wherein the first arm is moveable between a first position and a second position,
   wherein in the second position, the first arm is insertable into the opening on the back face of the housing portion while the electrical connector is spaced apart from the connector of the handheld computer, and
   wherein when the first arm is inserted into the opening of the handheld computer in the first position, the electrical connector is in contact with the connector of the handheld computer, and the coupling mechanism is configured to resist the first arm from being moved towards the second position.

36. The communication device of claim 35, wherein the coupling mechanism includes a spring to increase a bias of the first arm when the first arm is moved from the first position to the second position.

37. The communication device of claim 36, the coupling mechanism includes a member and one or more arms, and wherein the one or more arms extend from the member to engage one or more corresponding openings on the back face of the housing portion.

38. A communication device for a handheld computer, the communication device comprising:
   an electrical connector; and
   a coupling mechanism configured to direct a housing portion of the handheld computer towards the electrical connector while maintaining contact between the electrical connector and a connector of the handheld computer;
   wherein the coupling mechanism includes a member and one or more arms, and wherein the one or more arms extend from the member to engage one or more corresponding openings on the back face of the housing portion;
   wherein the coupling mechanism includes an elongated spring that connects the member to the base structure of the communication device;
   wherein the member is moveable between a first position and a second position, the second position corresponding to the elongated spring being stretched, and wherein in the second position, the one or more arms are each insertable into the corresponding openings in the back face of the housing portion;
   wherein subsequently the member is releasable from the second position to the first position so as to cause the electrical connector to be forced into contact with the connector of the handheld computer.

39. The communication device of claim 38, wherein the one or more arms extend from the member, a first one of the arms extending into a first opening of housing portion, and a second one of the arms extending into a second opening of the housing portion.

40. The communication device of claim 38, wherein the support structure supports the handheld computer at an angle of between 0 and 45 degrees about an axis corresponding to a gravitational direction on the handheld computer.

41. The communication device of claim 38, wherein the support structure supports the handheld computer at an angle of about 5 degrees about an axis corresponding to a gravitational direction on the handheld computer.

42. The communication device of claim 38, wherein the support structure corresponds to a wall-mount.

43. The communication device of claim 38, further comprising a line connection to extend communications from a computer to the handheld computer via the electrical connector and the connector of the handheld computer.

44. The communication device of claim 38, further comprising one or more alignment structures formed on the support structure in order to facilitate alignment of the handheld computer with the support structure when the coupling mechanism directs the housing portion of the handheld computer towards the electrical connector.

45. The communication device of claim 38, wherein the support structure includes a ledge to support a bottom of the handheld computer.

46. The communication device of claim 45, wherein the electrical connector extends outward from the ledge.

* * * * *